United States Patent [19]

Fenicle

[11] 4,413,200

[45] Nov. 1, 1983

[54] DYNAMOELECTRIC MACHINE WITH CARTRIDGE BRUSH HOLDER

[75] Inventor: Robert D. Fenicle, Sylvania, Ohio

[73] Assignee: Allied Corporation, Morristown, N.J.

[21] Appl. No.: 318,082

[22] Filed: Nov. 4, 1981

[51] Int. Cl.³ ............................................ H02K 13/00
[52] U.S. Cl. ..................................... 310/239; 310/242
[58] Field of Search ............... 310/239, 240, 241, 242, 310/245, 246, 247, 238

[56] References Cited

U.S. PATENT DOCUMENTS

| | | | |
|---|---|---|---|
| 2,794,139 | 5/1957 | Horner | 310/239 |
| 3,005,078 | 10/1961 | Mottu | 310/247 |
| 3,026,434 | 3/1962 | Verhagen | 310/247 |
| 3,034,006 | 5/1962 | Short | 310/247 |
| 3,387,156 | 6/1968 | Elow | 310/247 |
| 3,641,379 | 2/1972 | Vick | 310/239 |
| 3,898,493 | 8/1975 | Schaffer | 310/239 |
| 4,250,613 | 2/1981 | Sauerwein | 310/239 |

Primary Examiner—R. Skudy
Attorney, Agent, or Firm—James P. DeClercq

[57] ABSTRACT

A structure for retaining a cartridge brush holder in a dynamoelectric machine having a tubular frame member having a smooth curved inner surface and an outer surface is shown, including an aperture adapted to receive a generally cylindrical body of said cartridge brush holders through the frame member, the body of the cartridge brush holder being installed through the aperture with its flange adjacent the outer surface. A plano-convex member having a first convex surface and a second flat surface and having a bore therethrough receives the body of the cartridge bursh holder. A spring washer is placed over the cylindrical body of the brush holder, and retained by a retaining ring means pressed over the cylindrical body of the brush holder adjacent the spring washer to compress the spring washer to retain the brush holder in the tubular frame member.

4 Claims, 2 Drawing Figures

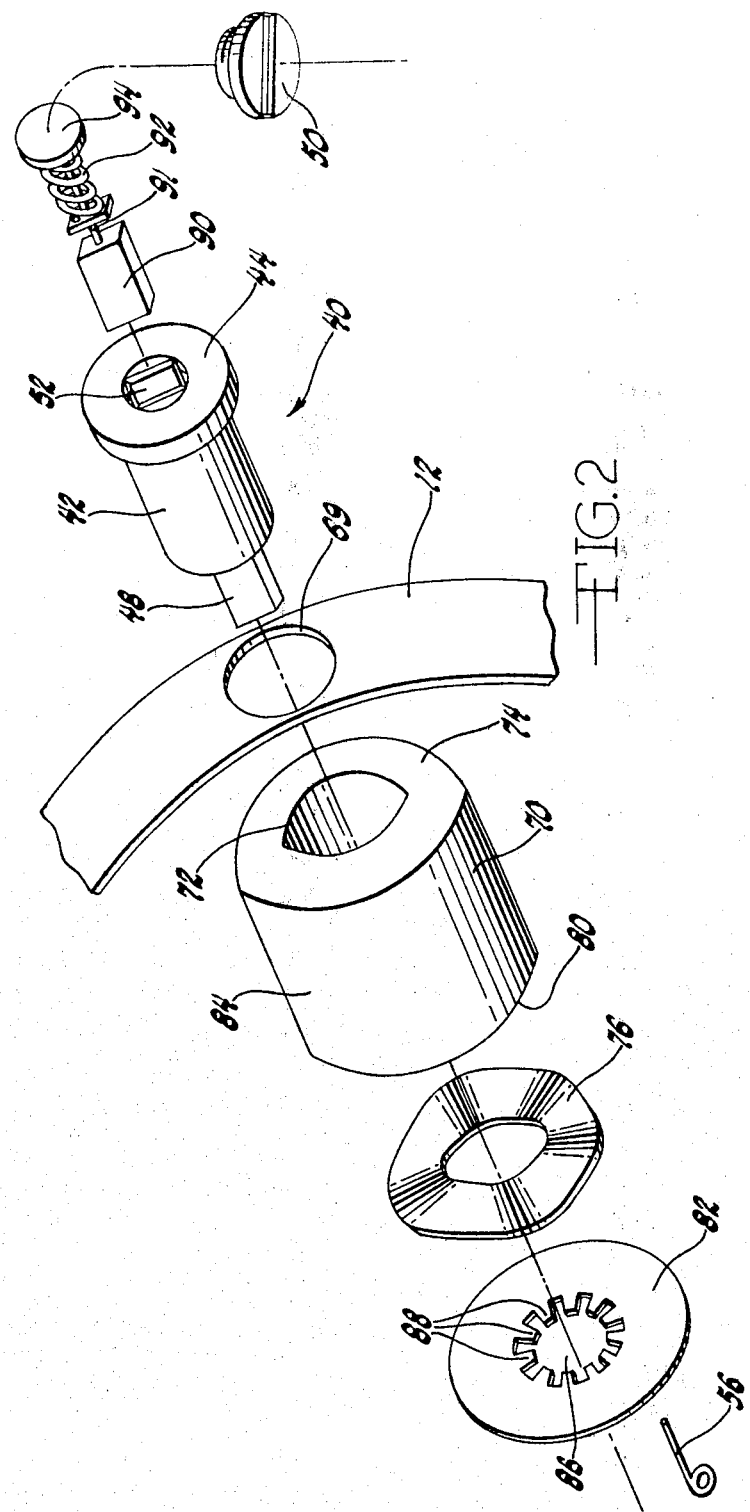

DYNAMOELECTRIC MACHINE WITH CARTRIDGE BRUSH HOLDER

This application relates to the field of dynamoelectric machines. In particular, this application relates to structure and method for retaining a conventional cartridge-type brush holder in a tubular frame motor.

BACKGROUND OF THE INVENTION

In the prior art, there are several different types of frames for dynamoelectric machines, such as AC and DC motors and generators, several types of end members known as end bells, and several types of brush holders. Frames have been cast in a hollow tubular shape and machined to provide a smooth inner surface of predetermined diameter. Frames have been cast to have a predetermined contour on the inner surface, and partially machined so that a portion of the length of the frame is adapted to receive field coils or magnets, or produced by pouring a plastic material around field magnets and flux path members. Brush holding channels are attached to or made integral with an end bell, which also serves to support the shaft of the dynamoelectric machine adjacent the contact area, such as a commutator surface or slip ring surface of the rotating armature.

As is well-known, it is difficult to renew brushes mounted in an end bell of a dynamoelectric machine, since the machine must be disassembled to remove the end bell, generally by removing through-bolts from the machine, and the end bell reinstalled with new brushes. Retaining the brushes in a retracted position until the end bell has been reinstalled, with the brushes adjacent the commutator or slip ring, and then releasing them, is a difficult task at best, even when using the thin resilient special tools used for initial assembly of the machine. Of course, the replacement brushes can be severely damaged and broken in this attempt. For this reason, dynamoelectric machines with brushes in an end bell which must be removed to replace brushes is generally considered very difficult to repair. Large motors with deep end bells are usually provided with access plates which can be removed to gain access to brushes, so that brushes can be replaced without removing the end bell. Smaller motors, and those with flat or shallow end bells cannot be provided with access openings.

To make a small dynamoelectric machine easily repairable, cartridge-type brush holders are used. Typically, these brush holders have a generally cylindrical plastic body surrounding a rectangular tube which accepts a rectangular brush, and accepts a threaded cap which makes electrical contact with the rectangular tube. The brush has a lead which terminates in a small flat plate and a spring encircling the lead between the brush and the flat plate. In use, the brush is inserted in the rectangular tube of the brush holder, and the cap presses the metal plate into electrical contact with the rectangular tube. Internal electrical connections to the brushes are made to the rectangular conductive tube. Thus, renewing the brushes is a relatively simple task. However, the motor frame must have a thick enough section to retain the cartridge-type brush holder. For example, a cast motor frame may be machined adjacent the armature, and not machined adjacent the commutator to leave the frame thick in that area, and a cartridge brush holder having a retaining flange and a threaded area for a retaining nut on the other is placed in a bore through the frame.

Alternately, to conserve material, the frame may be cast with thick areas only where the cartridge brush holders will be used. A bore for the cartridge brush holder is made, and threaded bores adapted to receive set screws are made in the direction of the axis of the machine, intersecting the bores. The brush holders are inserted, and retained by set screws tightened against the body of the brush holder, and locked in place by varnish or the like.

Typically, modern motors of greater than two inches (5.08 cm) and approximately eight inches (20.4 cm) are produced with a tubular iron or steel frame, serving both as a mechanical enclosure and a path for the magnetic flux of wound field poles or field magnets, as thin as is practical for the flux density necessary. This frame is provided with relatively flat, cost-efficient end bells or plates, one of which carries brushes and a shaft bearing, the other carrying only a shaft bearing, the machine being assembled with through-bolts. As will be apparent, it is difficult to service such a machine to replace its brushes, one approach being complete disassembly of the machine, placing the armature contact surface between the brushes on the end bell, and inserting the armature and end bell into the frame as an assembly. This cannot reasonably be done with wound-field machines, since it would be necessary to reconnect the connections between brushes and field coils at reassembly, a task which cannot be accomplished with the brush-holding end frame on the machine frame, because the wound poles cannot be removed after original assembly. Alternately, the end plate and brushes may be placed over the armature contact surface. This is often a long and tedious task, due to the difficulty of holding spring-loaded brushes clear of the armature contact surface when the brushes themselves are nearly inaccessible.

The instant invention overcomes these and other deficiencies of the prior art.

SUMMARY OF THE INVENTION

In accordance with the invention, a dynamoelectric machine having a tubular frame, such as is produced by cutting sections of a longer tube of ferromagnetic material, or by deep-drawing to form a tube, or by bending a sheet around a mandrel to form a tube, is provided with cartride brush holders, so that the brushes may be easily and conveniently renewed without disassembling the machine. Thus, it is an object of the invention to provide a dynamoelectric machine having a thin tubular frame with cartridge-type brush holders. It is a feature of the invention that the cartridge brush holders may be retained in an aperture in the frame, with a conventional retaining flange of the brush holder bearing against the outer surface of the frame, by means of a piano-convex member having a bore disposed around the body of the brush holder protruding into the interior of the motor frame, having its convex surface against the interior surface of the motor frame, spring means placed around the body of the brush holder, and retaining ring means frictionally engaging the body of the brush holder to compress the spring and draw the retaining flange of the brush holder firmly against the exterior surface of the motor, and press the plano-convex member against the inner surface of the motor, to ridgedly retain a cartridge brush holder. It is an advantage of the invention that brushes may be replaced in a thin-frame dynamoelectric machine without disassembling the machine.

BRIEF DESCRIPTION OF THE DRAWINGS

FIG. 2 is an exploded perspective view of a cartridge brush holder and mounting and retaining means according to the invention.

DETAILED DESCRIPTION OF THE DRAWINGS

Figure 1:
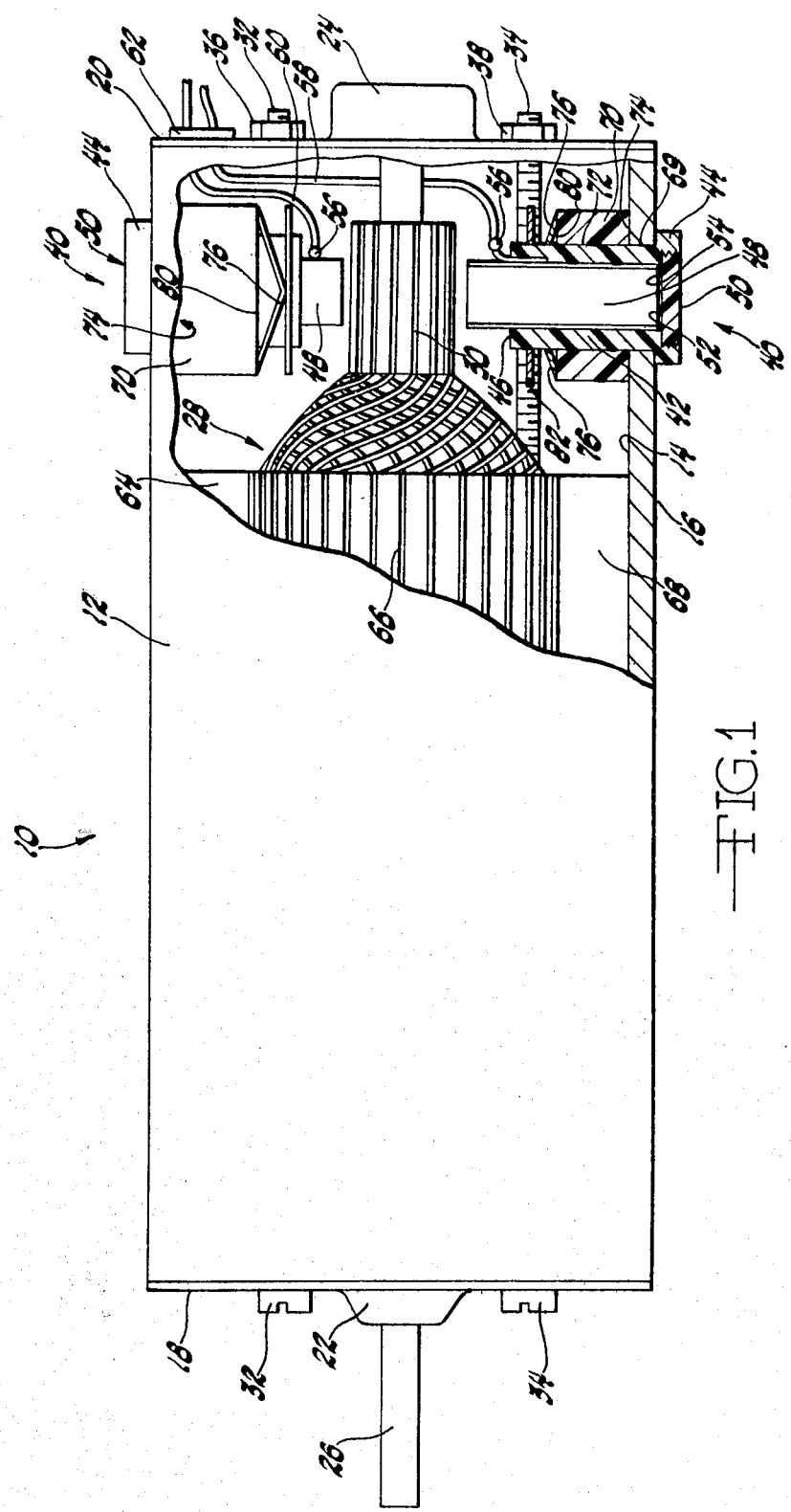
FIG. 1 is a side elevational view of a dynamoelectric machine according to the invention.

As will be apparent, the drawings illustrate a dynamoelectric machine having field magnets, rather than wound field poles, for clarity and readability. The preferred embodiment of the invention is a direct current motor, which inherently can be used as a generator, if desired, although the structure and method of the invention are equally applicable to AC motors and generators. The invention is particularly suited for machines of intermediate size where thin wall tubular frames may be used, due to the flux density needed and the amount of thermal mass required, but may also be used on larger dynamoelectric machines, and to decrease the amount of frame material needed in smaller dynamoelectric machines that conventionally use cartridge brush holders.

Referring specifically to FIG. 1, a dynamoelectric machine 10 includes a tubular frame 12 having a smooth inner surface 14 and a smooth outer surface 16. Shaft-end end bell 18, and blind-end end bell 20 contain bearing housings 22 and 24 respectively, to retain bearings, not shown, to rotatably support shaft 26 of armature 28 within frame 12. Armature 28 is provided with an armature contact surface shown as commutator surface 30.

In the illustrated embodiment, end bells 18 and 20 are retained to housing 12 by through-bolts shown as bolts 32 and 34, and nuts 36 and 38. End bells 20 and 22 are held centered with respect to tubular frame 12 by means of indentations forming internal protrusions, not shown, near the periphery of end bells 18 and 20 which bear against inner surface 14 of tubular frame 12.

Cartridge brush holders 40 include a generally cylindrical plastic body 42, having an integral retaining flange portion 44. Molded into body 42, and protruding from end 46 of body 42 is a brass, generally rectangular brush guide tube 48, adapted to receive a brush, not shown, for making electrical contact with commutator surface 30. A threaded removable plug 50 presses the conductive disk attached to the lead of a conventional brush, not shown, to be pressed between end 52 of tube 48 and surface 54 of plug 50. Electrical contact is made to a brush through brush guide tube 48 by means of a clip 56, which is inserted between body 42 and tube 48, and is connected to wires such as wires 58 and 60, which may pass through a grommet 62 in an aperture, not shown, in end bell 20, or may be connected to conventional connection studs, not shown, emplaced through housing 12, to be connected to a source of power or to a load, as appropriate. As will be apparent, if rotational energy is applied to a shaft such as shaft 22 of a dynamoelectric machine according to the invention, the interaction between windings of armature 28 and a stationary field such as may be produced by magnets such as north magnets 64 and south magnets 68, or by wound field poles, the illustrated embodiment of the invention will act as a generator, and produce a voltage which may be collected by brushes, in brush holders 40.

Conversely, if electrical power is applied to wires 58 and 60, shaft 26 will rotate.

In preparation for installation of brush holders 40, a portion of outer surface 16 adjacent apertures 69 may be advantageously flattened, such as by spot-facing, to present a flat surface to retaining flange portion 44. However, in an actual physical embodiment of a dynamoelectric machine according to the invention, it has been found that there is no need to flatten the area under retaining flange portion 44. A brush holder 40 is inserted through an aperture 69, and a plano-convex member 70 having a bore 72 which is slightly larger than generally cylindrical plastic body 42 is placed on brush holder 40, with first convex surface 74 adjacent inner surface 14 of frame 12. A spring means here shown as a spring washer 76 is placed adjacent second flat or planar surface 80 of plano-convex member 70. Spring washer 76 may be a spring washer with a single bend, or with more than one bend, such as a wave washer. Then, a retaining ring means 82 is pressed onto plastic body 42, compressing spring washer 76, and drawing flange portion 44 firmly against surface 16 of frame 12. Preferably, retaining ring means 82 is provided with a central aperture having a plurality of resilient prongs, which bend to allow retaining ring means 82 to be placed over body 42 and resist forces tending to remove retaining ring means 82 from body 42. The force exerted by spring water 76 urges retaining flange portion 44 against outer surface 16, and urges convex surface 74 of plano-convex member 70 against inner surface 14, thus rigidly retaining brush holder 40 in tubular frame 12. Electrical connection may then be made at initial assembly to brush guide tube 48 of brush holder 40 by means of clips 56 inserted between body 42 and brush guide tube 48.

FIG. 2 is an exploded perspective view of a cartridge brush holder 40 and the means for mounting it according to the invention. As shown, generally cylindrical plastic body 42 is passed through aperture 69 in tubular frame 12, and through bore 72 of plano-convex member 70. Plano-convex member 70 is positioned with convex surface 74 adjacent tubular frame 12. As illustrated, plano-convex member has a cylindrical outer surface 84. However, the axial contours of plano-convex member 70 may be square or any other convenient shape. Then, a spring washer 76 is placed over the portion of body 42 protruding beyond flat surface 80, and compressed against surface 80 by retaining ring means 82, which is pressed onto the protruding end of body 42. As shown, retaining ring means 82 includes a central aperture 86 having a plurality of inwardly directed teeth or prongs 88. However, as will be apparent, there are numerous other types of retaining ring means which could be used, including C-shaped snap rings cooperating with a circumferential groove in body 42, or the like. Then, a clip 56 is pressed between body 42 and brush guide tube 48, to make electrical contact to tube 48. A brush 90 having a brush lead 91, surrounded by a spring 92 and terminated in a disk member 94 is inserted into guide tube 48, with disk member 94 resting against end 52 of tube 48. Then, plug 50 is screwed into place, pressing disk member 94 against end 52, making electrical connection between tube 48 and brush 90.

In an actual physical embodiment of dynamoelectric machine according to the invention, end bell 18 is extended beyond that shown in the drawing to allow for placement of a conventional cooling fan on shaft 26 adjacent armature 28. This feature has been omitted from the drawing for clarity.

Also, in a commercial embodiment of a dynamoelectric machine according to the invention, wires 58 and 60, rather than passing through a grommet 62, pass through frame 12 by means of conventional stud terminals. Such terminals have been omitted from the drawing for clarity. Of course, a conventional two-terminal connector may also be used.

The illustrated embodiment of a dynamoelectric machine according to the invention is a two-pole machine, having two brushes and four stationary field poles. A commercial embodiment has also been constructed with four brushes retained in four cartridge brush holders 40 and having eight stationary field poles.

As will be apparent, numerous modifications and variations of the subject invention will be apparent to one skilled in the art in view of the disclosure above, and may be made without departing from the spirit and scope of the invention.

What is claimed is:

1. A dynamoelectric machine, including:
   a tubular frame member having an inner surface and an outer surface, said inner surface and said outer surface being curved planar surfaces;
   means for producing a stationary magnetic field affixed to said inner surface;
   an armature rotatably disposed within said tubular frame adjacent said means for producing a staionary magnetic field and including an armature contact surface;
   said tubular frame defining at least first and second apertures connecting said inner surface and said outer surface;
   at least first and second cartridge brush holder means, each said brush holder means including a generally cylindrical body having a retaining flange at one end thereof, each said cartridge brush holder means being disposed through one said aperture and having said retaining flange disposed adjacent said outer surface;
   at least two plano-convex members, each said plano-convex member having a first convex surface and a second flat surface and defining a bore therethrough connecting said first surface and said second surface, each said bore being adapted to receive one said generally cylindrical body of one said cartridge brush holder means therethrough;
   each said plano-convex member being disposed about said generally cylindrical body of one said cartridge brush holder means and having said first surface disposed adjacent said inner surface;
   at least two spring means, each said spring means defining an aperture therethrough, said aperture being adapted to receive one said generally cylindrical body therethrough;
   each said spring means being disposed about one said generally cylindrical body adjacent one said plano-convex member adjacent said second surface;
   at least two retaining ring means, each said retaining ring means defining an aperture therethrough, said aperture being adapted to frictionally receive one said generally-cylindrical body therethrough;
   each said retaining ring means being disposed about one said generally-cylindrical body adjacent said spring means, to compress said spring means between said retaining ring means and said second surface, said spring means firmly drawing said retaining flange adjacent said outer surface to firmly retain said cartridge brush holder means in said tubular frame member.

2. A dynamoelectric machine according to claim 1, wherein:
   said plano-convex member is a cylindrical member.

3. A dynamoelectric machine according to claim 1, wherein:
   said spring means is a spring washer.

4. A dynamoelectric machine according to claim 1, wherein:
   said retaining ring means is a flat ring defining a central aperture therethrough, said central aperture including a plurality of inwardly radially directed prongs.

* * * * *